United States Patent [19]
Schmidt, Jr. et al.

[11] 3,744,633
[45] July 10, 1973

[54] FILTER APPARATUS AND METHOD OF FILTRATION

[75] Inventors: Henry Schmidt, Jr., Hinsdale; James F. Zievers, La Grange, both of Ill.

[73] Assignee: Industrial Filter & Pump Mfg. Co., Cicero, Ill.

[22] Filed: Jan. 18, 1971

[21] Appl. No.: 107,308

[52] U.S. Cl. ............. 210/82, 210/333, 210/DIG. 18
[51] Int. Cl. ............................................. B01d 29/38
[58] Field of Search ................. 210/82, 96, 99, 104, 210/108, 111, 112, 113, 114, 332–334, DIG. 18

[56] References Cited
UNITED STATES PATENTS

| | | | |
|---|---|---|---|
| 2,035,592 | 3/1936 | Christensen | 210/112 X |
| 3,212,643 | 10/1965 | Schmidt, Jr. et al. | 210/DIG. 18 |
| 3,356,215 | 12/1967 | Miles, Jr. | 210/333 X |
| 3,438,502 | 4/1969 | Schmidt, Jr. et al. | 210/333 X |
| 1,843,198 | 2/1932 | Berguerand | 210/112 X |
| 1,263,226 | 4/1918 | Genter | 210/111 X |
| 3,128,786 | 4/1964 | Badgett | 210/96 X |

Primary Examiner—John Adee
Attorney—Fidler, Patnaude & Lazo

[57] ABSTRACT

A system for filtering thick liquids includes a filter tank having a relatively tall filter chamber and a plurality of filter elements mounted in the upper portion of the chamber. Filter cake built up on the filter elements is dislodged from all of the filter elements simultaneously for cleaning purposes, whereby the dislodged filter cake falls to the lower portion of the chamber and is removed from a discharge port at the lower portion of the chamber. A density detector controls a valve for the discharge port so that when the density of the liquid in the tank increases beyond a predetermined level, the discharge port is automatically opened, and then automatically closed when the density falls below a predetermined level.

4 Claims, 3 Drawing Figures

INVENTORS
HENRY SCHMIDT JR.
JAMES F. ZIEVERS

FILTER APPARATUS AND METHOD OF FILTRATION

The present invention relates to a filter apparatus and a method of filtration for thick liquids, and it more particularly relates to a method and apparatus for filtering thick liquids with filter elements, which apparatus includes means for discharging filter cake from the filter elements.

In filtering some relatively thick liquids, such for example, as a liquid having from 0.1 to 20 per cent by volume of entrained solids, the filter cake composed of suspension solids accumulates on the filter elements. Thus, there is a problem of cleaning the filter elements in order to maintain effective operation of the filter. In an attempt to overcome this problem, a continuous self-cleaning filter apparatus, which is disclosed in U.S. Pat. No. 3,356,215, was developed. This type of filter apparatus includes means for discharging the filter cake from a group of the filter elements in a continuous operation. Thus, while some of the filter elements are filtering the liquid, the remaining filter elements are being cleaned. However, this type of filter apparatus is not entirely satisfactory since the discharged filter cake can accumulate on adjacent filter elements which are in the process of filtering the liquid thus impairing the efficiency of operation of the filter. It would be highly desirable, therefore, to have a method and apparatus for filtering thick liquids and for cleaning the filter elements to maintain effective operation of the filter without clogging adjacent filter elements.

Therefore, the principal object of the present invention is to provide a new and improved method and apparatus for filtering thick liquids.

A further object of the present invention is to provide a new and improved method and apparatus for filtering thick liquids and for dislodging filter cake from the filter elements without causing the dislodged filter cake to accumulate or redeposit on adjacent filter elements or on the same element.

Briefly, the above and further objects of the present invention are realized in accordance with a preferred embodiment of the present invention by providing a filter tank having an elongated filter chamber in which a plurality of filter elements are mounted in the upper portion of the chamber, and means for periodically discharging the filter cake from all of the filter elements simultaneously for cleaning purposes. The lower portion of the tank is provided with a valve-controlled discharge port which is operated in response to a density detector for sensing the density of the liquid in the lower portion of the chamber, and which conveys liquid from the chamber when the density of the liquid in the lower portion of the chamber exceeds a predetermined value. Thus, the filter apparatus is periodically shut down, the filter cake removed, and the dislodged filter cake then settles through the liquid in the chamber into the lower portion of the chamber. After a time delay, the dislodged filter cake is removed from the lower portion of the tank via the discharge port.

These and further objects of the present invention will be understood more fully and completely from the following detailed description when considered with reference to the accompanying drawings, wherein.

Figure 1:
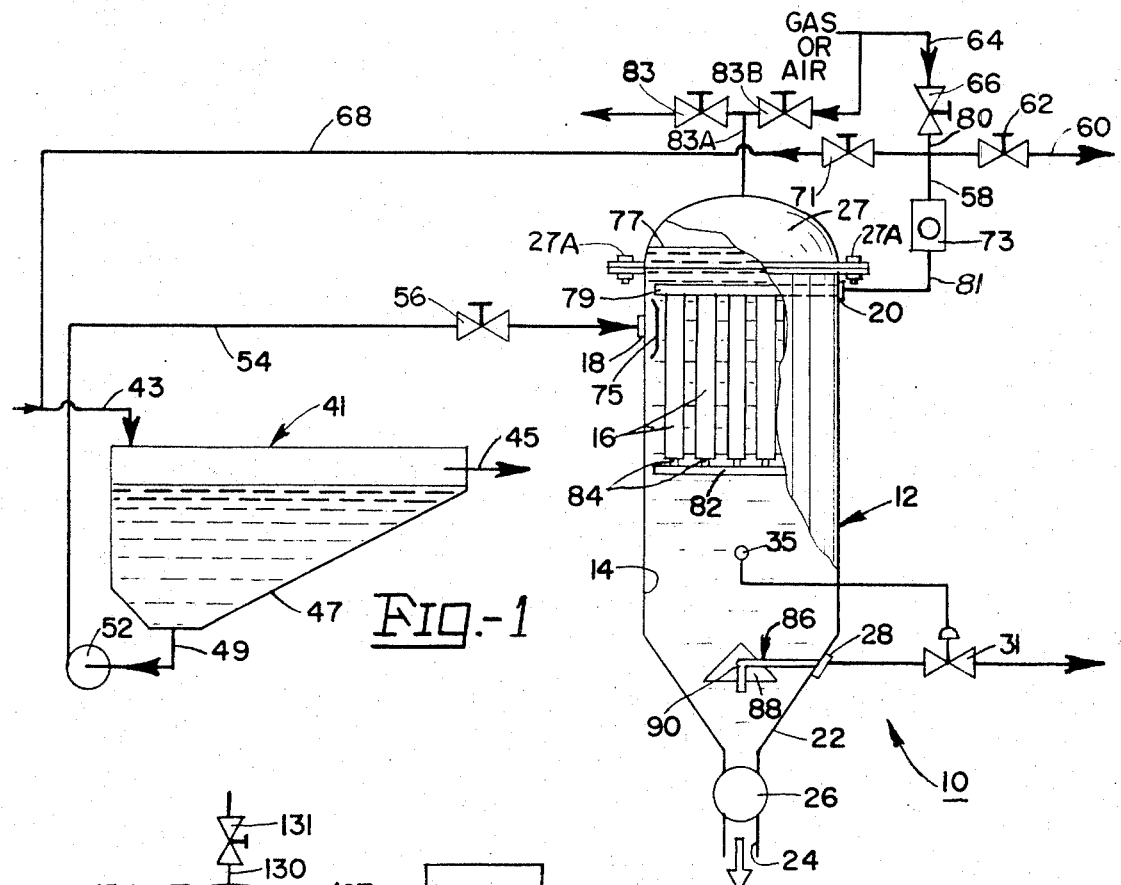
FIG. 1 is a schematic diagram of a filter system utilizing tubular-type filter elements and incorporating principles of the present invention.

Referring now to FIG. 1 of the drawings, there is shown a filter system 10 which incorporates the principles of the present invention. The system includes a cylindrically-shaped filter tank 12 having a filter chamber 14 in which a plurality of tubular filter elements 16 are mounted. An inlet 18 and an outlet 20 are provided near the top of the tank 12, the outlet 20 being connected to the filter elements 16. The tank 12 has a conically shaped bottom wall 22 terminating in a centrally disposed, lowermost drainage opening or port 24 having a normally-closed valve 26 in line with the opening 24. A dome-shaped cover 27 is clamped in place by a plurality of suitable clamps, such as the clamps 27A, to permit the tank 12 to be operated under pressure. A discharge port 28 in the bottom wall 22 conveys the sedimentation-entrained liquid from the tank 12 under the control of a valve 31 which is operated by a density detector 35 including a sensing element located in the lower portion of the chamber 14. When the density of the liquid in the lower portion of the chamber 14 exceeds a predetermined value of density, the detector 35 opens the valve 31 to permit the heavy liquid at the bottom of the tank 12 to exit the chamber 14 until the density of the liquid in the chamber 14 falls below a predetermined value of density. When the density of the liquid is below the last-mentioned predetermined value, the detector 35 closes the valve 31. A clarifying reservoir 41 includes an inlet 43, an outlet 45, and a sloping bottom wall 47 which terminates in a sediment outlet 49, whereby the liquid to be filtered is first pumped into the clarifier 47 so that solids entrained in the liquid can first settle to the bottom of the reservoir 47. In order to clarify the sediment in the reservoir 47, a pump 52 pumps the sediment from the bottom of the reservoir 47 via a line 54, which is provided with a shut-off valve 56 downstream of the pump 52, to the inlet 18 of the tank 12. An outlet line 58 is connected to the outlet 20 to convey the filtrate from the tank 12 to an outlet line 60 which is provided with a shut-off valve 62 and which conveys the filtrate to a collection tank (not shown) or to a further stage of filtration. A line 64 is connected in fluid communication with the line 58 via a normally-closed shut-off valve 66 to convey gas or air under pressure to the filter elements 16 via the outlet 20 to force the filtrate downstream of the filter elements 16 back through the filter elements 16 to dislodge the filter cake built up thereon. Before initiating operation of the filter 10 or after a filter cake cleaning cycle of operation, a line 68, which is connected to the line 43 via a shut-off valve 71, conveys the filtrate to the reservoir 41 for recirculating the filtrate to the filter elements 16 for the purpose of building up a pre-coat layer of filter cake on the filter elements 16 until the filtrate leaving the tank 12 becomes clear as viewed by means of a sight glass 73 in the line 58.

Considering now the tank 12 in greater detail, a baffle 75 is mounted in the chamber 14 opposite the inlet 18 to prevent the liquid to be filtered from flowing directly against the adjacent filter element 16 opposite the inlet 18, so that the incoming liquid to be filtered is diverted away from the adjacent filter element 16 and spreads throughout the chamber 14. The liquid to be filtered fills the tank and a portion of the dome-shaped cover 27 to a level 77 at which level the pressure of the air trapped in the cover 27 is equal to the pressure of the liquid entering the inlet 18. A manifold 79 is disposed above the filter elements 16 and communicates with each of the filter elements 16 and the outlet 20.

In order to prevent the air or other gas from entering the chamber 14 during a cleaning cycle of operation, the total volume of all of the filter elements 16 and the manifold 79 is equal to or preferably greater than the total volume of the outlet pipe 58, a pipe 80 connecting the valve 66 and the pipe 58, the sight glass 73, and a pipe 81 connecting the sight glass 73 and the outlet 20. As a result, during a cleaning cycle of operation the air or gas from the pipe 64 forces the filtrate in the pipes 58, 80 and 81 and the sight glass 73 back through the manifold 79 and the filter elements 16 without entering the outlet 20. An air bleed valve 83 is connected to a vent line 83A, which is connected in fluid communication with the cover 27, to vent the chamber 14 to the atmosphere prior to initiating the cleaning operation so that when the air pressure acts to force the filtrate into the chamber 14 via the outlet 20, the pressure in the chamber 14 is atmospheric pressure. Also, in order to facilitate the removal of the dislodged filter cake from the tank 12, a valve 83B connected between the vent line 83A and the source (not shown) of gas or air may be opened during the cleaning cycle of operation to aid in removing the filter cake from the filter tank 12 by forcing air or gas under pressure into the chamber 14 from above the elements 16.

While most of the valves illustrated in the drawings are shown to be manually-operated valves, it is to be understood that they can also be automatically-controlled valves. In this regard, the valve 66 for the gas line 64, the inlet valve 56 and the outlet valve 62 are preferably automatic valves which are opened in response to the closing of the outlet valve 62 and the inlet valve 56, and which are closed after a predetermined time interval. This time interval is sufficiently long to permit a sufficient amount of the filtrate trapped between the valve 66 and the outlet 20, to flow into the outlet 20 and out the filter elements 16, and is sufficiently short to prevent any of the gas from entering the outlet 20.

A spacer 82 having a plurality of upstanding pins 84 supports the filter elements 16 from below. Connected in fluid communication with the discharge port 28 is a pipe 86 which extends in the lower portion of the chamber 14 through an opening in a conically-shaped baffle 88, and which has a downwardly disposed distal end portion 90 extending below the baffle 88 to ensure that the thicker liquid is withdrawn from the tank 12 via the pipe 86.

METHOD OF OPERATION

In order to commence the operation of the filter 10, the valve 56 for the inlet 18 and the valve 71 for the recirculation line 68 are opened, and the other valves are closed to permit the pump 52 to pump the liquid to be filtered from the reservoir 41 to the chamber 14. The liquid to be filtered fills the tank to the level 77 in the cover 27, at which level the pressure of the air trapped in the cover 27 is equal to the pressure of the liquid entering the inlet 18. In so doing, some of the liquid is pumped into the hollow filter elements 16 and out the outlet 20 via the manifold 79. The liquid leaving the tank 12 recirculates via the line 68 to the pump 52 so that a layer of filter cake builds up on the exterior of the filter elements 16. The recirculation continues until the liquid in the line 58 becomes clear as viewed through the sight glass 73, at which time the valve 71 in the recirculation line 68 is closed and the valve 62 in the outlet line 60 is opened to commence a cycle of filtering operation.

During the filtering cycle of operation, some of the entrained solids build up on the cake of the filter elements 16 while the heavier ones of these solids settle into the lower portion of the chamber 14 below the filter elements 16. Once the density of the liquid below the filter elements 16 increases beyond a predetermined value, the density detector 35 automatically opens the valve 31 to permit a portion of the liquid in the lower portion of the chamber 14 to exit the tank 12 via the pipe 86 until the density of the liquid below the filter element 16 falls below a predetermined value, at which density the density detector 35 automatically closes the valve 31.

When the layers of filter cake on the filter element 16 build up to a point where the efficiency of operation of the filter 10 is impeded, a cleaning cycle of operation is initiated. The thickness of the filter cake can be detected by any suitable means, such as a thickness detector in the chamber 14 or by a pressure detector which monitors the pressure of the fluid in the outlet line 58, but it is preferred to commence a cleaning cycle of operation of all of the filter elements 16 at periodic time intervals, such as every 20 minutes, under the control of suitable timing means (not shown).

In order to commence a cleaning cycle of operation by suitable automatic control means (not shown), the outlet valve 62 in the outlet line 60 is automatically closed, and the inlet valve 56 is also automatically closed. Moreover, the valve 31 for the discharge port 28 is automatically locked in its closed position in response to the closing of the inlet valve 56 or the outlet valve 62 so that the port 28 does not empty the liquid from the tank 12 during a cleaning cycle of operation, whereby the filter elements 16 remain submerged at all times. The valve 66 is then automatically opened to permit the gas under pressure to force the filtrate trapped between the valve 66 and the outlet 20 back into the manifold 79 and out the filter elements 16 without having the gas enter the outlet 20 so that the filter cake on the exterior of the filter elements 16 are dislodged therefrom. The system 10 then remains shut down for a given time delay, such as three minutes, to permit the dislodged filter cake solids to settle into the lower portion of the chamber 14 below the filter element 16. After the time delay, a recirculation cycle of operation is commenced to build up a fresh filter cake on the filter elements 16. Thereafter, the system 10 is returned to the line, the valve 31 is automatically unlocked, and the density detector 33 then opens the valve 31 to permit the sedimentation-entrained liquid or sludge to be withdrawn from the tank 12 via the discharge port 28 until the density of the liquid in the tank 12 falls below a predetermined value of density.

Figure 2:
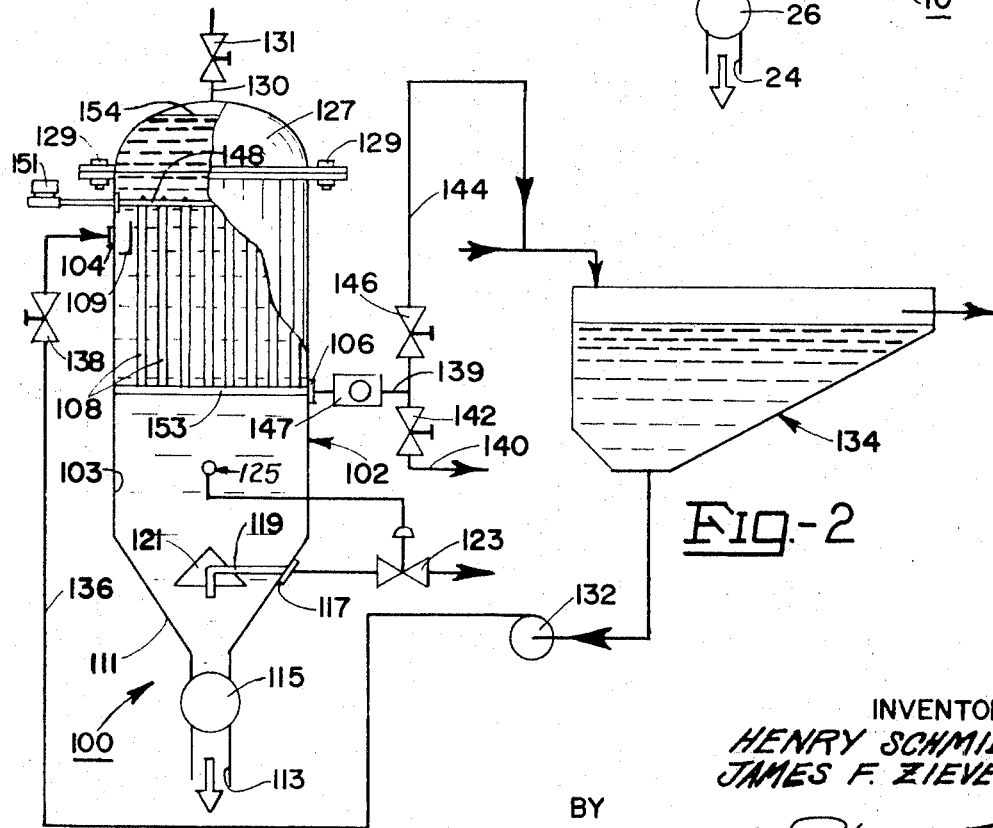
FIG. 2 is a schematic illustration of a filter system which employs filter leaves and which also incorporates principles of the present invention.

Referring now to FIG. 2, there is shown a filter system 100 which incorporates principles of the present invention. The filter system 100 is similar to the filter system 10 except that the filter system 100 utilizes filter leaves instead of tubular filter elements. The system 100 includes a cylindrical filter tank 102 having an elongated chamber 103 and having an inlet 104 and an outlet 106. A plurality of filter leaves 108 are mounted in spaced-apart relationship in the chamber 103, and a baffle 109 is disposed in the chamber 103 near the inlet 104 to prevent the liquid to be filtered from flowing directly against the filter leaves 108. The tank 102 has a conically shaped bottom wall 111 terminating in a lowermost drainage opening 113 having a normally closed drainage valve 115. A discharge port 117 in the bottom wall 111 conveys the sedimentation from the bottom portion of the chamber 103 via a pipe 119 which extends through a conically-shaped baffle 121 in the same manner as the pipe 86 in the baffle 88 of FIG. 1. A valve 123 which controls the outlet port 117 is controlled by a density detector 125, which is similar to the density detector 35 of FIG. 1.

A cover 127 is clamped in place on the tank 102 by means of suitable clamps, such as the clamps 129, so that the filter 100 can be operated above atmospheric pressure. A vent line 130 extends outwardly from the cover 127 and communicates with the chamber 103 to permit the tank 102 to be substantially filled with liquid, and after filling, a float-type vent valve 131 in the vent line 130 closes automatically in response to the liquid in the tank 102 to permit above atmospheric-pressure operation. A pump 132 pumps the liquid to be clarified from a clarifier reservoir 134, which is similar to the reservoir 41 of FIG. 1, via a line 136 having a shut-off valve 138 to the inlet 104 of the tank 102. A line 139 which is connected in fluid communication with the outlet 106 conveys the filtrate to an outlet line 140 via a shut-off valve 142. While the shut-off valve 142 is shown to be a manually-operated valve for illustration purposes in the drawings, it is to be understood that the valve 142 and many of the other valves of the system 100 are preferably automatically-controlled valves. In order to build up a filter cake on the filter leaves 108 by recirculating the filtrate from outlet 106 to the inlet 104, a line 144 is connected from the line 139 via a shut-off valve 146 to the reservoir 134 in the same manner as the line 68 of FIG. 1. For the purpose of cleaning the filter leaves 108, a bar 148 is rigidly connected to the upper portions of the filter leaves 108 and extends through an opening in the tank 102 to an impactor 151 located externally of the tank 102 for impacting the filter leaves 108 to dislodge the filter cake therefrom periodically. A high speed reciprocatory impacting device, which may be used as the impactor 151, is disclosed in U.S. Pat. No. 3,212,643. A manifold 153 is connected in fluid communication with the bottom end portions of the leaves 108 and the outlet 106.

In operation, in order to build up a filter cake on the filter leaves before commencing a filtering operation, the outlet valve 142 is automatically closed and the recirculating valve 146 and the inlet valve 138 are automatically opened to permit the pump 132 to pump the liquid to be filtered into the tank 102 to substantially fill it to the level 154, at which level the vent valve 131 automatically closes. During the filling operation, the liquid enters the filter leaves 108 and is conveyed via the manifold 153 and the line 139 to the recirculating line 144. Once the liquid in the line 139 becomes clear as viewed through the sight glass 147, the valve 146 in the recirculating line 144 is closed, and the outlet valve 142 is then automatically opened in the outlet line 140 to permit the filter 100 to commence a filtering cycle of operation.

For the purpose of cleaning the filter leaves 108, a cleaning cycle of operation is commenced to clean all of the leaves simultaneously. In this regard, the outlet valve 142 is automatically closed, and then the inlet valve 138 in line with the inlet 104 is automatically closed. The valve 123 for the discharge port 117 is automatically locked in its closed position to ensure that the filter leaves 108 remain submerged during the cleaning operation. The impactor 151 then impacts all of the filter leaves 108 simultaneously to discharge the filter cake from all of the leaves 108. The dislodged filter cake then settles in the liquid in the tank into the lower portion thereof below the filter leaves 108. After a sufficient time delay, such as from one to three minutes, the liquid to be filtered is recirculated to build up a fresh filter cake on the filter leaves 108. Thereafter, the filter system 100 is returned to the line for another filtering cycle of operation, and the discharge valve 123 is automatically unlocked to permit the density detector 125 to open the valve 123 to discharge the sedimentation-entrained liquid or sludge from the lower portion of the chamber 103.

Figure 3:
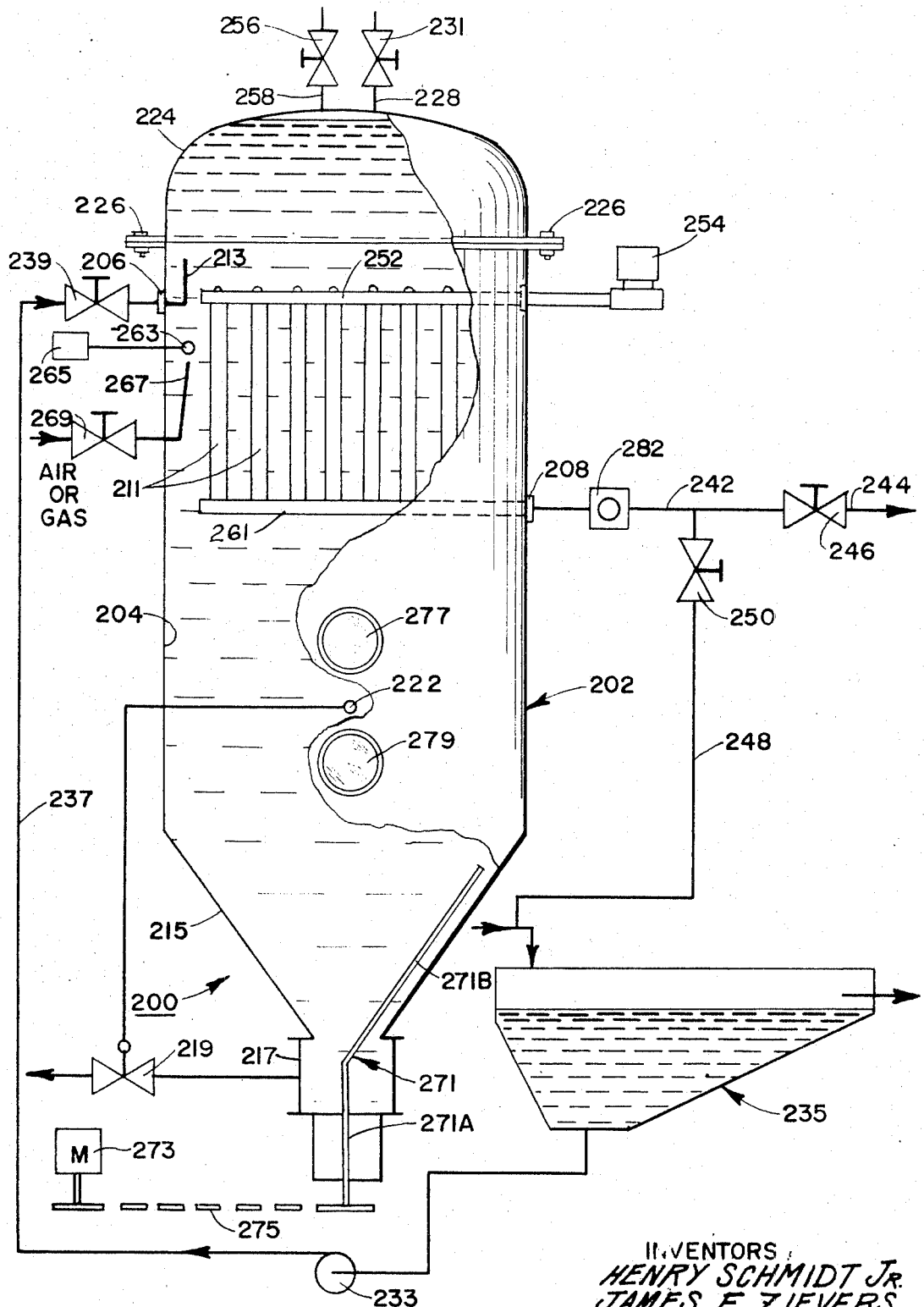
FIG. 3 is a schematic illustration of another filter system which employs filter leaves and which also incorporates principles of the present invention.

Referring now to FIG. 3, there is shown in schematic form another filter system 200 which incorporates principles of the present invention. The system 200 includes a cylindrical filter tank 202 having an elongated chamber 204 provided with an inlet 206 and an outlet 208. A plurality of filter leaves 211 are mounted in spaced relationship in the chamber 204 between the inlet 206 and the outlet 208. Disposed within the chamber 204 and communicating with the inlet 206 is an L-shaped pipe 213 which has its exit end directed upwardly away from the filter elements 211 so that the liquid to be filtered entering the inlet 206 does not flow directly against the filter leaves 211. As shown, the tank 202 has a conically shaped bottom wall 215 terminating in a lowermost drainage port 217 connected to a drainage valve 219. A density detector 222 is similar to the density detector 35 of FIG. 1 and controls the valve 219.

A cover 224 is clamped in place on the tank 202 by means of suitable clamps such as the clamps 226 whereby the filter 200 can be operated at a pressure above atmospheric. A vent line 228 extends outwardly from the cover 224 and communicates with the chamber 204 to open it to the atmosphere during filling of the tank 202 so that the tank 202 can be substantially filled with liquid and a flow type valve 231 in the vent line 228 closes automatically in response to the liquid therein whereby to seal the chamber 204 during a filtering cycle of operation. A pump 233 is provided for pumping the liquid to be filtered from a clarifier reservoir 235, which is similar to the reservoir 41 of FIG. 1, via a line 237 and a shut-off valve 239 to the inlet 206. In order to convey the filtrate from the tank 202, a line 242 communicates with the outlet 208 and is connected in fluid communication with an outlet line 244 via a shut-off valve 246. For illustration purposes, the shut-off valve is shown to be a manually operated valve, however it will be understood by those skilled in the art that the valve 246 and many of the other valves of the system 200 are preferably automatically controlled valves. A return line 248 is connected between the line 242 and the clarifier 235 by a valve 250 primarily for recirculating the filtrate from the outlet 208 to the inlet 206 during the prefilt cycle. In order to clean the filter leaves 211, a bar 252 is rigidly connected to the upper portions of the filter leaves 211 and sealably extends through an opening in the tank 202 to a vibratory impactor 254 located externally of the tank 202 for impacting the filter leaves 211 to dislodge the filter cake therefrom periodically in the same manner as the impactor 151 dislodges the filter cake from the leaves of the filter 100. A valve 256 in a vent line 258 to the cover 224 is opened during the cleaning cycle of operation to reduce the chamber pressure to atmospheric pressure to the diaphragm seal to the vibrator 254.

A cake thickness detector 263 is disposed within the chamber 204 adjacent the filter leaves 211 for the purpose of initiating a cleaning cycle of operation when the thickness of the filter cake on the filter leaves exceeds a predetermined thickness at which time the cake thickness detector control device 265 responds to the cake thickness detector 263 to commence the cleaning cycle of operation. A pipe 267 is connected to a source (not shown) of pressurized air or gas via a valve 269 and extends into the chamber 204 so that the exit end thereof is directed toward the cake thickness detector 263, whereby when the valve 269 is opened air is directed against the cake thickness detector 263 to clean it.

In order to facilitate the removal of the filter cake which settles toward the bottom of the tank 202, a motor driven wand 271 is journalled for rotation at the discharge port 217 and is driven by an electric motor 273 which has an output shaft drivingly connected to the wand 271 by a belt or chain 275. The wand 271 includes a vertical portion 271a which sealably extends through the bottom of the tank and a main portion 271b which extends close to and lies parallel to the bottom of the sloping bottom wall of the tank 202 so that the scraper wand 271 can agitate the heavy mud at the bottom of the tank to facilitate its removal through the discharge port 217.

A pair of sight ports 277 and 279 in the side wall of the tank 202 are vertically spaced one above the other to permit viewing of the material in the tank. As shown, the ports 277 and 279 are disposed above and below the density detector 222.

In operation, in order to build up a filter cake on the filter leaves 211 before commencing a filtering operation, the outlet valve 244 is closed and the recirculating valve 250 and the inlet valve 239 are automatically opened to permit the pump 233 to pump the liquid to be filtered into the tank 202 to substantially fill it. In this regard, at the beginning of the filling operation the vent valve 231 is open, and when the liquid rises in the tank 202 to fill it, the vent valve 231 is automatically closed by the liquid. During the filling operation, the liquid enters the filter leaves 211 and is conveyed via the manifold 261 and the line 242 to the recirculating line 248. Once the liquid in the line 242 becomes clear as viewed through a slight glass 282, the valve 250 is closed, and the outlet valve 246 is then opened in the outlet line 244 to permit the filter 200 to commence a filtering cycle of operation.

For the purpose of cleaning the filter leaves 211, a cleaning cycle of operation is commenced to clean all of the leaves simultaneously. In this regard, the filtering cycle of operation is terminated in response to the cake thickness detector 263, or, alternatively, after a predetermined interval of time. In order to to prepare for the cleaning cycle of operation the inlet valve 239 and the outlet valve 244 are closed, and the valve 269 is opened to supply air under pressure to the air sparge line 267. Thereafter, the vent line valve 256 is opened to permit the air in the chamber 204 to decrease to atmospheric pressure. After approximately a five-second time delay, the impactor 254 vibrates the filter leaves 211 for approximately ninety seconds to discharge the filter cake from the filter leaves 211. Thereafter, the impact 254 is turned off and the vent valve 256 is closed. Thereupon, the inlet valve 239 is opened and the drive motor 273 is energized to drive the scraper wand 271. At the same time, the density detector 222 responds to the increased density resulting from the cake discharged from the filter leaves and causes the valve 219 to open so that the heavy mud can flow from the discharge port 217. The want 271 continues to slough the sedimentation or sludge in the bottom of the tank 202 for approximately 30 to 60 seconds. Thereafter, the motor 273 is de-energized to stop the rotation of the want 271. The valve 219 is subsequently closed by the density detector 222 or, alternatively, the valve 219 can be time-controlled. After a sufficient time delay, such as from 1 to 3 minutes, the liquid to be filtered is recirculated to build up a fresh filter cake on the filter leaves 211. Thereafter, the filter 200 is returned to the line for another filtering cycle of operation. If desired, the motor 273 may be directly controlled by the sensor 222 so as to drive the wand 271 only when the mud in the bottom eof the tank 202 is at a depth wherein the drain valve 219 is opened.

In view of the foregoing description, it should now be apparent that there is provided in accordance with the present invention a method and apparatus for filtering thick liquids in an elongated filter tank with a plurality of filter elements and for cleaning all of the filter elements simultaneously during a cleaning cycle of operation. Also, a density detector selectively controls a discharge port, whereby when the density of the liquid in the tank increases beyond a predetermined density level, the density detector automatically opens a valve for the discharge port and then automatically closes the valve after the density of the liquid falls below a predetermined level.

While the present invention has been described in connection with a particular embodiment thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention.

What is claimed is:

1. A method of removing solids entrained in a liquid, comprising the steps of establishing a flow of said liquid and entrained solids into the upper portion of a vertically elongated filter chamber and to a clarified liquid outlet through a plurality of filter elements disposed in the upper portion only of said chamber to deposit said solids in the form of filter cakes on said filter elements, thereafter initiating a filter element cleaning operation by interrupting said flow of liquid into said chamber and through said filter elements, and then simultaneously discharging said filter cakes from all of said filter elements while said filter elements are submersed in liquid and said flow remains interrupted, permitting the discharged filter cake material to settle in said chamber below said filter elements while said flow remains interrupted and said filter elements remain submersed in said liquid, after a sufficient time delay to permit substantially all of said filter cake material to settle in said chamber below said filter elements re-establishing said flow of liquid and entrained solids into said chamber and through said filter elements, and opening an outlet near the bottom of said chamber to permit the discharged filter cake material from the bottom of said chamber to exit said chamber, said outlet being maintained closed throughout said filter element cleaning operation.

2. A method filtration according to claim 1, wherein said filter cake is discharged from all of said filter elements by simultaneously impacting all of said elements.

3. A method according to claim 1 comprising the further step of maintaining the pressure in said chamber at substantially atmospheric during the discharge of said filter cake from said filter elements.

4. A method according to claim 3 wherein said filter elements are filter leaves and said step of discharging said filter cake from said filter elements is carried out by reciprocally moving said filter leaves in the liquid in which they are immersed.

* * * * *